…

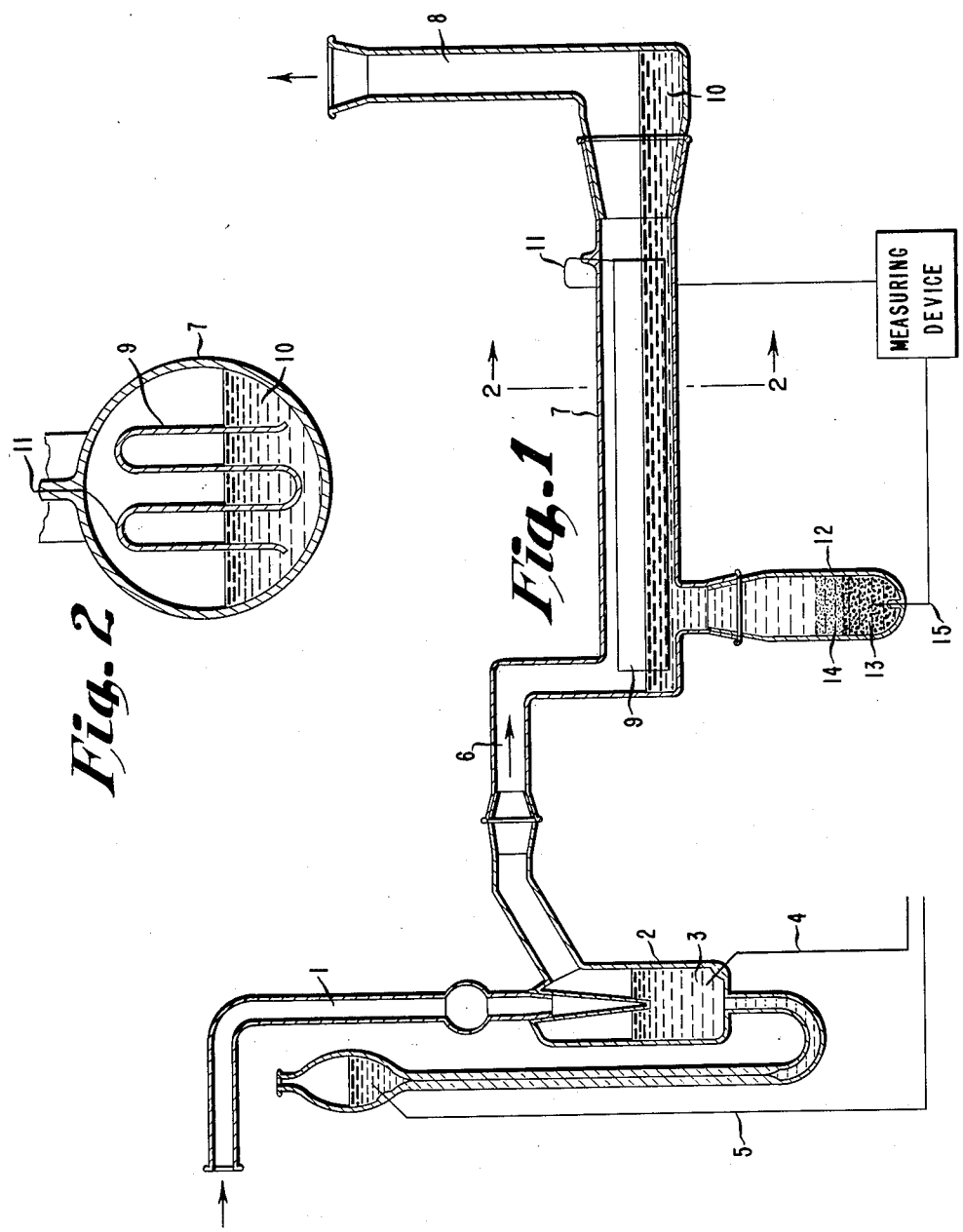

United States Patent Office 3,003,932
Patented Oct. 10, 1961

3,003,932
APPARATUS FOR THE GALVANIC ANALYSIS OF HYDROGEN
Harold Joseph Frey, Jr., and Roger Conant Voter, Wilmington, Del., assignors to E. I. du Pont De Nemours and Company, Wilmington, Del., a corporation of Delaware
Filed Mar. 28, 1956, Ser. No. 574,412
3 Claims. (Cl. 204—1)

This invention relates to an apparatus and a method for detecting or measuring the concentration of trace amounts of hydrogen in gases, and particularly in gases containing hydrocarbons.

Methods employed heretofore have measured hydrogen concentration on the basis of chemical absorption, heat of combustion and thermal conductivity. These methods require difficult and expensive equipment, are not readily adapted to continuous analysis, are not accurate when only trace amounts of hydrogen are present, and, furthermore, frequently cannot be operated in the presence of saturated or unsaturated hydrocarbons. The principle of galvanic analysis has heretofore been applied to the analysis of oxygen, and, in order to determine the quantity of hydrogen present, indirect methods had to be used, such as burning the hydrogen with known amounts of oxygen. Such methods make the continuous analysis for hydrogen difficult and less reliable. The chemical composition of the gas is changed through the combustion step, creating additional areas for possible error and inaccuracy. For the continuous determination of hydrogen in the presence of saturated and unsaturated hydrocarbons, the galvanic analysis of oxygen cannot be successfully used, particularly where only trace amounts of hydrogen are involved.

It is, therefore, an object of the present invention to provide an improved method for the direct analysis of small amounts of hydrogen in a gas stream. It is another object to provide an apparatus for the continuous analysis of hydrogen. It is still another object to provide a method for the analysis of hydrogen employing a galvanic principle. A further object of the present invention is to provide a method for the analysis of hydrogen which will operate in the presence of gaseous hydrocarbons. Yet another objective is an apparatus and a method to determine trace amounts of hydrogen which can be operated continuously over long periods of time. Other objectives will become apparent hereinafter.

The objects of the present invention are accomplished by a galvanic system comprising a solid metal anode consisting of a noble metal having thereon deposited a colloidal coating of the same or another noble metal, said metal anode being in contact with a gas stream containing the hydrogen to be analyzed, a mercury-mercurous chloride cathode, a solution of an acidic electrolyte, said solution being in contact with both the said metal anode and the said mercury-mercurous chloride cathode, means for contacting the gas stream with the said metal anode and means for measuring the current generated by the hydrogen present in the gas stream.

The principle of the method of analysis is the oxidation of molecular hydrogen, which has been absorbed on the metal anode and has migrated into the electrolyte solution to form hydrogen ions and electrons, and the reaction of electrons at the cathode with the mercurous chloride of the calomel electrode to form mercury and chloride ions. Through these reactions a difference in electric potential is created between the two electrodes, causing a current to flow if the two electrodes are connected to form a circuit. The current is proportional to the concentration of the hydrogen in the gas stream and thus can be used to measure the concentration of the hydrogen in the gas, employing a galvanometer or other suitable current measuring devices. The current may also be used to activate signalling or monitoring devices. However, the proportionality of the current to the hydrogen concentration is no longer constant at concentrations of 1000 parts per million and higher, and such concentrations are preferably avoided. For higher concentrations of hydrogen it is therefore preferred to dilute the gas stream to be analyzed with known amounts of an inert gas such as nitrogen. The potential of the mercury-mercurous chloride cathode, is such that hydrogen will be oxidized to hydrogen ions, but that other gaseous compounds, particularly saturated and unsaturated hydrocarbons, will remain unaffected. It is, however, necessary to exclude oxygen and other gases which will oxidize hydrogen in the presence of the metal anode, since such, as is readily seen, will interfere in the anode reaction. In the absence of hydrogen no current, or only insignificant amounts of current, will flow across the electrodes; such currents may be corrected by adjustment of the measuring instruments.

The hydrogen analyzer is calibrated by means of a calibrating cell which releases known amounts of hydrogen by way of electrolysis, and is designed in such a manner that no oxygen is released into the gas stream. Thus an aqueous electrolyte solution is subjected to a known current between two platinum electrodes and the hydrogen formed at the cathode is fed to the hydrogen analyzer by means of an inert gas stream. The amount of hydrogen released is calculated from the current and, knowing the amount of hydrogen and the flow rate of the inert gas stream, the response of the hydrogen analyzer can be calibrated. Although the hydrogen analyzer of the present invention dos not drift appreciably, it is preferred to calibrate the instrument at regular intervals.

The electrolyte in the analyzer is preferably an acid, an acidic salt or a combination of both, since an acidic solution will suppress the concentration of hydroxyl ions which may combine to form oxygen gas, thus interfering in the galvanic system on which the instrument of the present invention is based. A preferred electrolyte is a mixture of potassium chloride and hydrochloric acid. The solution in the analyzer is furthermore saturated with respect to mercurous chloride which is present as a solid at the cathode.

The invention is further illustrated by means of the attached drawings, in which all parts are made out of glass unless otherwise noted.

FIGURE 1 is a vertical section of the apparatus including the calibrating cell.

FIGURE 2 is a vertical section of the apparatus at line AA'.

Referring to FIGURES 1 and 2, the gas to be analyzed for hydrogen enters through tube 1 into the calibrating cell 2. Not shown in the drawing are means for removing carbon dioxide and oxygen traces in the gas stream, and instruments to measure the flow rate of the gas stream. Oxygen is preferably removed by passing the gas stream through two scrubbers containing an aqueous solution of potassium hydroxide and sodium anthraquinone β-sulfonate. Amalgamated zinc added to the solution in the scrubber will reduce the sodium anthraquinone β-sulfonate after it is oxidized by the oxygen in the gas stream. Preferably, an excess quantity of mercury is used to keep the amalgam in a liquid form. The calibrating cell 2 is a standard water electrolysis unit containing in the water an electrolyte such as sodium chloride. The electrodes 4 and 5 are platinum wire electrodes, the cathode at which the hydrogen is formed being the platinum wire 4. The platinum electrodes are connected to a current source such as a battery and an ammeter, or a galvanometer by which the amount of current passing through the electrolysis unit can be calculated is also incorporated in the circuit. Since this is a standard circuit, it is not shown in the drawing. Knowing the amount of current and the flow rate of an inert gas passing through the system, the hydrogen analyzer can thus be calibrated.

The gas stream to be analyzed passes from the calibrating unit through the removable connection 6 to the horizontal analyzer tube 7, and from there to the outlet 8, from where the gas may be returned to the process stream. The metal anode 9, located in the analyzer tube, consists of a solid noble metal sheet coated with a layer of colloidal particles fo the same or a different noble metal. Preferably, a platinized platinum anode is used. The method of obtaining such a platinized platinum anode is described by H. J. S. Sand in "Electrochemistry and Electrochemical Analysis," vol. III, p. 64, 1941. The accuracy of the hydrogen analysis depends, to a large extent, on the metal anode. In order to absorb sufficient of the hydrogen present in the gas stream to obtain a satisfactory signal, a very large surface area is required which can only be obtained if the anode surface is coated with a colloidal deposit of a noble metal. The metal used for the anode must be completely inert to the hydrogen, and therefore platinum is preferred. The anode is placed in the analyzer tube, such that it is in contact with the passing gas stream and the electrolyte 10. The actual design of the anode is preferably one in which the anode is of a large surface area as illustrated in the drawings. The anode is attached to the platinum wire 11 which leads to the measuring or signalling device shown here only schematically.

The hydrogen absorbed on the anode migrates into the electrolyte solution 10 in which the anode is partially immersed. The electrolyte solution is a saturated aqueous solution of mercurous chloride containing as the conducting electrolyte an acid or an acid salt or a combination of both. Preferred electrolytes are solutions of hydrochloric acid and potassium or sodium chloride.

To the analyzer tube 7 is attached the calomel half cel 12, which is in contact with the electrolyte solution in the analyzer tube. The calomel half cell comprises a pool of mercury 13, which is in contact with the platinum wire 15 extending into the mercury. The mercury 13 is in contact with an intimate mixture of solid mercurous chloride and mercury 14 in which the cathode reaction occurs. The platinum wire lead 15 is connected to the measuring or signalling device.

The operation of the hydrogen analyzer of the present invention is simple. Prior to use for analysis of a continuous gas stream containing small quantities of hydrogen, the response of the analyzer is determined with the aid of the calibrating cell for various known quantities of hydrogen and at various flow rates. From these data, the proportionality of hydrogen to current observed in measuring circuit is determined. This gas is then removed and the gas to be analyzed is passed through the system at the same rates for which calibration data were obtained. The galvanometer or other measuring device placed in the analyzer circuit will then show the quantity of the hydrogen present in the gas streaming through the analyzer. There may be a small residual current obtained in the analyzer in the absence of hydrogen and the current obtained from the hydrogen must then be corrected for that amount. The cathode of the present invention is slowly used up during the analysis and is replaced periodically wth fresh mercury-mercurous chloride paste.

The analyzer of the present invention is, of course, not limited to the particular design illustrated. Many variations of the design of the analyzer which incorporate the critical features of the present invention may be used in the analysis of hydrogen.

As stated hereinabove, the analyzer is particularly well suited to analyze for hydrogen in the presence of saturated and unsaturated hydrocarbon gases. These gases will not coat or affect the anode for a considerable period of time. Oxygen must be removed, since it will cause a current to flow in the reverse direction. The hydrogen analyzer is useful in a range of 1 to 1000 parts per million of hydrogen in the gas stream.

The analyzer of the present invention is well suited for monitoring gas streams in plant processes and other large scale operations involving hydrocarbon stream. Although of simple design, it is a highly sensitive instrument.

We claim:

1. A method for measuring the hydrogen concentration in hydrocarbon gas streams containing from 1 to 1000 parts per million of hydrogen, and containing no hydrogen oxidizing agents, which comprises passing a gas stream containing from 1 to 1000 parts per million of hydrogen into a hollow receptacle containing a noble metal sheet anode having a surface coated with a colloidal deposit of a noble metal, an electrolyte solution, and a mercury-mercurous chloride cathode, said electrolyte being in contact with said anode and said cathode, contacting said gas stream with the metal anode above the level of said electrolyte, and indicating by means of an external circuit and a current measuring device the current produced as a result of said gas stream contacting said anode, whereby a measure of the concentration of the hydrogen in said gas stream is obtained.

2. The method as set forth in claim 1 wherein the anode employed is a platinized platinum anode.

3. The method as set forth in claim 1 wherein the electrolyte employed is a mixture of hydrochloric acid and potassium chloride.

References Cited in the file of this patent

UNITED STATES PATENTS

| | | |
|---|---|---|
| 1,875,503 | Rowland | Sept. 6, 1932 |
| 2,238,903 | Lieneweg | Apr. 22, 1941 |
| 2,651,612 | Haller | Sept. 8, 1953 |
| 2,805,191 | Hersch | Sept. 3, 1957 |

OTHER REFERENCES

French et al.: Metal Industry, Nov. 9, 1928, pp. 443–446.

Manov et al.: J. of Res. of N.B.S., Res Paper RP1632, vol. 34, 1945, pp. 115–127.

Bray: Industrial and Eng. Chem., vol. 20, No. 4, pp. 421–423.